US010302431B2

(12) United States Patent
Aoyama et al.

(10) Patent No.: US 10,302,431 B2
(45) Date of Patent: May 28, 2019

(54) PHYSICAL QUANTITY DETECTION CIRCUIT, ELECTRONIC DEVICE, AND MOVING OBJECT

(71) Applicants: Seiko Epson Corporation, Tokyo (JP); DENSO CORPORATION, Kariya, Aichi-pref. (JP)

(72) Inventors: Takashi Aoyama, Chino (JP); Naoki Yoshida, Kariya (JP)

(73) Assignees: SEIKO EPSON CORPORATION (JP); DENSO CORPORATION (JP)

( * ) Notice: Subject to any disclaimer, the term of this patent is extended or adjusted under 35 U.S.C. 154(b) by 251 days.

(21) Appl. No.: 15/343,656

(22) Filed: Nov. 4, 2016

(65) Prior Publication Data

US 2017/0131099 A1    May 11, 2017

(30) Foreign Application Priority Data

Nov. 9, 2015    (JP) .................................. 2015-219725

(51) Int. Cl.
*G01C 19/5642*    (2012.01)
*G01C 19/5614*    (2012.01)

(52) U.S. Cl.
CPC ..... *G01C 19/5642* (2013.01); *G01C 19/5614* (2013.01)

(58) Field of Classification Search
CPC .................. G01C 19/5614; G01C 19/5649

USPC ........................................... 73/504.12
See application file for complete search history.

(56) References Cited

U.S. PATENT DOCUMENTS 8,701,487 B2 *  4/2014  Naruse ............... G01C 19/5726
73/497
2010/0326189 A1   12/2010  Sato et al.

FOREIGN PATENT DOCUMENTS

JP    2010-286368 A    12/2010

* cited by examiner

*Primary Examiner* — John E Chapman, Jr.
(74) *Attorney, Agent, or Firm* — Harness, Dickey & Pierce, P.L.C.

(57) ABSTRACT

A physical quantity detection circuit includes: a synchronous detection circuit that performs a synchronous detection process on a detection target signal based on a detection signal, the detection target signal including a physical quantity detection signal and a leakage signal from a physical quantity detection element, the physical quantity detection element vibrating based on a drive signal to generate the physical quantity detection signal corresponding to a magnitude of a physical quantity, and the leakage signal of vibrations based on the drive signal; and a phase shift circuit that switches a phase difference between the detection signal and the detection target signal, between a first phase difference and a second phase difference that differs from the first phase difference, so that at least part of the leakage signal is output through the synchronous detection process.

8 Claims, 12 Drawing Sheets

FIG.4
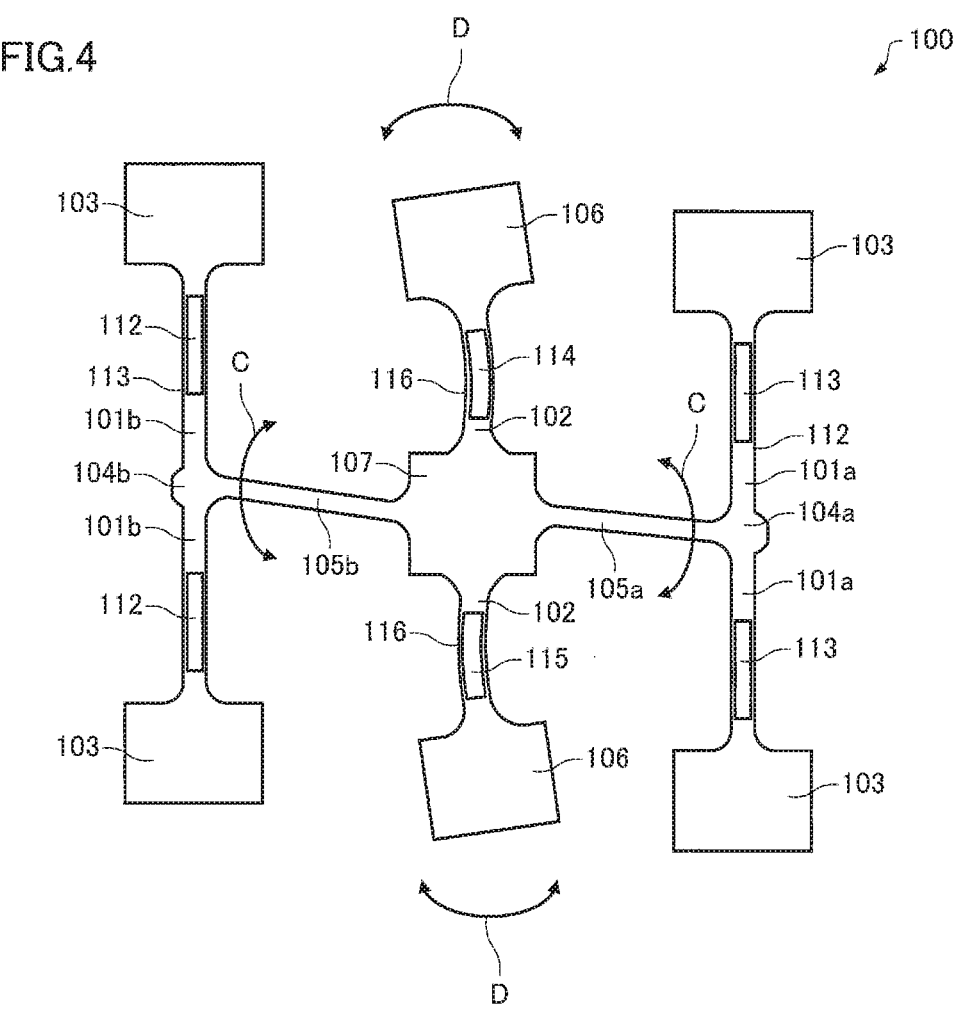
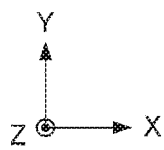

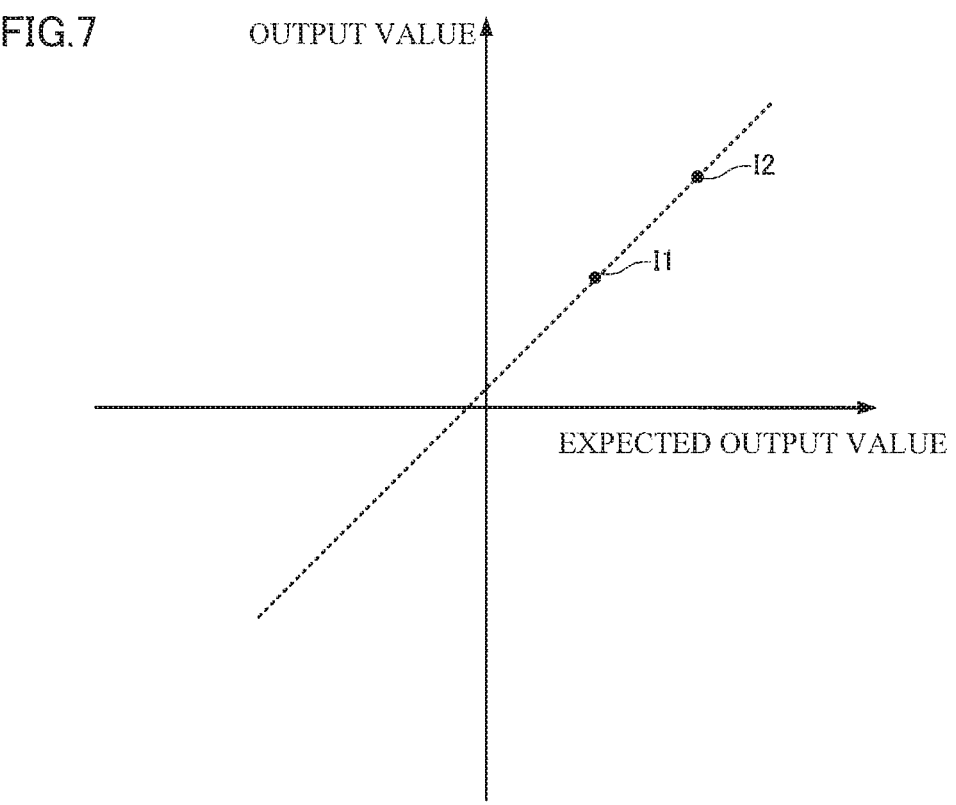

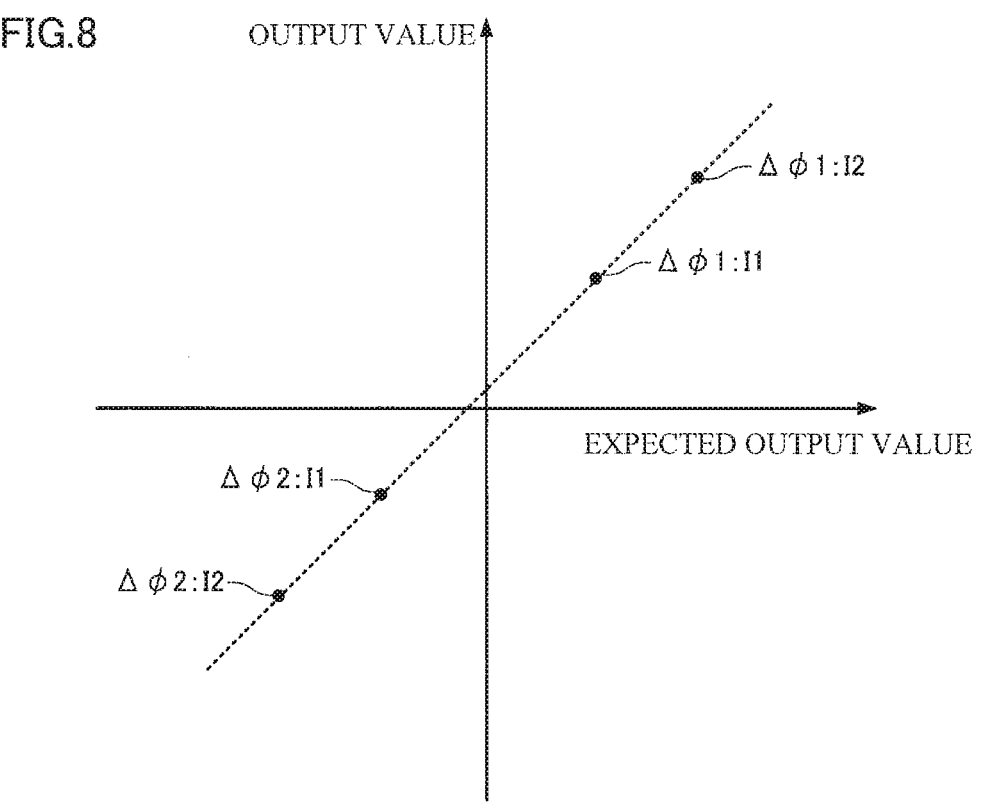

PHYSICAL QUANTITY DETECTION CIRCUIT, ELECTRONIC DEVICE, AND MOVING OBJECT

BACKGROUND OF THE INVENTION

The present invention relates to a physical quantity detection circuit, an electronic device, and a moving object.

A physical quantity detection device that detects an arbitrary physical quantity is known. For example, an angular velocity detection device that detects an angular velocity as the physical quantity is known, and an electronic device or a system that includes an angular velocity detection device, and performs a predetermined control process based on the angular velocity detected by the angular velocity detection device, is widely used. For example, a car (vehicle) travel control system may be configured to perform a travel control process that prevents a side skid based on the angular velocity detected by the angular velocity detection device.

Since such an electronic device or system may perform an erroneous control process when the angular velocity detection device has broken down, measures are taken (e.g., lighting an alarm lamp) when the angular velocity detection device has broken down, and various techniques have been proposed for implementing a breakdown diagnosis process on the angular velocity detection device. For example, JP-A-2010-286368 discloses a physical quantity detection device that changes the phase of a reference clock signal supplied to a synchronous detection circuit so that at least part of a leakage signal from a gyro sensor element is output.

According to JP-A-2010-286368, the synchronous detection circuit that extracts the leakage signal outputs a constant leakage signal using the reference clock signal of which the phase is fixed. Therefore, when the synchronous detection circuit has broken down, and outputs a constant value, it is difficult to detect that the synchronous detection circuit has broken down since it is difficult to determine whether or not the leakage signal output from the synchronous detection circuit differs from the leakage signal during normal operation.

SUMMARY

Several aspects of the invention may provide a physical quantity detection circuit, an electronic device, and a moving object that can improve the breakdown detection accuracy with respect to the synchronous detection circuit.

According to a first aspect of the invention, there is provided a physical quantity detection circuit including:

a synchronous detection circuit that performs a synchronous detection process on a detection target signal based on a detection signal, the detection target signal including a physical quantity detection signal and a leakage signal from a physical quantity detection element, the physical quantity detection element vibrating based on a drive signal to generate the physical quantity detection signal corresponding to a magnitude of a physical quantity, and the leakage signal of vibrations based on the drive signal; and a phase shift circuit that switches a phase difference between the detection signal and the detection target signal, between a first phase difference and a second phase difference that differs from the first phase difference, so that at least part of the leakage signal is output through the synchronous detection process.

According to a second aspect of the invention, there is provided an electronic device including the physical quantity detection circuit.

According to a third aspect of the invention, there is provided a moving object including the physical quantity detection circuit.

BRIEF DESCRIPTION OF THE SEVERAL VIEWS OF THE DRAWING

FIG. 4 illustrates the operation of a gyro sensor element.

FIG. 7 is a graph illustrating an example of the relationship between an expected output value and an actual output value in Example 2.

FIG. 8 is a graph illustrating an example of the relationship between an expected output value and an actual output value in Example 3.

DETAILED DESCRIPTION OF THE EMBODIMENT

Figure 1:
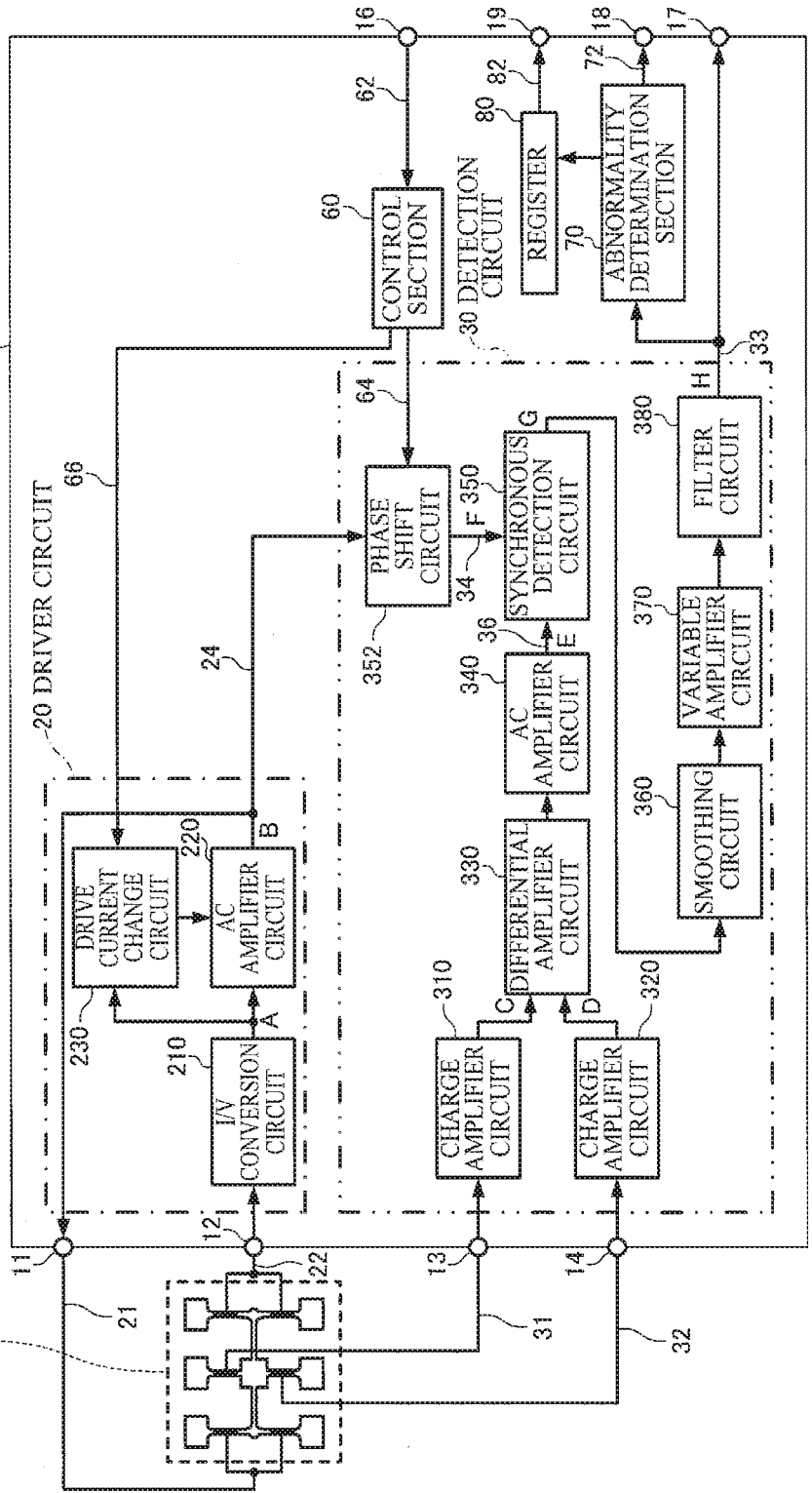
FIG. 1 illustrates the configuration of an angular velocity detection device according to the first embodiment.

The invention was conceived in order to solve at least some of the problems described above, and may be implemented as described below (see the following application examples).

APPLICATION EXAMPLE 1

According to one embodiment of the invention, a physical quantity detection circuit includes:

a synchronous detection circuit that performs a synchronous detection process on a detection target signal based on a detection signal, the detection target signal including a physical quantity detection signal and a leakage signal from a physical quantity detection element, the physical quantity detection element vibrating based on a drive signal to generate the physical quantity detection signal corresponding to a magnitude of a physical quantity, and the leakage signal of vibrations based on the drive signal; and a phase shift circuit that switches a phase difference between the detection signal and the detection target signal, between a first phase difference and a second phase difference that differs from the first phase difference, so that at least part of the leakage signal is output through the synchronous detection process.

According to Application Example 1, it is possible to change the expected output value from the synchronous detection circuit by switching the phase difference between the detection signal and the detection target signal between the first phase difference and the second phase difference. Therefore, when the synchronous detection circuit has broken down, and outputs a constant value, it is possible to detect that the synchronous detection circuit has broken down. Therefore, it is possible to implement a physical quantity detection circuit that can improve the breakdown detection accuracy with respect to the synchronous detection circuit.

APPLICATION EXAMPLE 2

The physical quantity detection circuit may further include a drive current change circuit that switches a current value of the drive signal between a first current value and a second current value that differs from the first current value at least when the phase difference is set to the first phase difference or when the phase difference is set to the second phase difference.

According to Application Example 2, it is possible to change the expected output value from the synchronous detection circuit by switching the current value of the drive signal between the first current value and the second current value. Therefore, when the synchronous detection circuit has broken down, and outputs a constant value, it is possible to detect that the synchronous detection circuit has broken down. Therefore, it is possible to implement a physical quantity detection circuit that can improve the breakdown detection accuracy with respect to the synchronous detection circuit.

APPLICATION EXAMPLE 3

The physical quantity detection circuit may further include an abnormality determination section that determines whether or not the physical quantity detection circuit is abnormal based on a signal output from the synchronous detection circuit.

According to Application Example 3, since it is possible to change the expected output value from the synchronous detection circuit, it is possible to implement a physical quantity detection circuit that can improve the breakdown detection accuracy with respect to the synchronous detection circuit.

APPLICATION EXAMPLE 4

The physical quantity detection circuit may further include a register, and the abnormality determination section may write error information into the register when it has been determined that the physical quantity detection circuit is abnormal.

According to Application Example 4, other circuit blocks and devices can easily utilize the error information.

APPLICATION EXAMPLE 5

In the physical quantity detection circuit, the abnormality determination section may output an error signal to the outside when it has been determined that the physical quantity detection circuit is abnormal.

According to Application Example 5, other circuit blocks and devices can easily utilize the error signal.

APPLICATION EXAMPLE 6

According to another embodiment of the invention, there is provided an electronic device including the physical quantity detection circuit.

According to Application Example 6, since the electronic device includes the physical quantity detection circuit that can improve the breakdown detection accuracy with respect to the synchronous detection circuit, it is possible to implement an electronic device that can detect the occurrence of a breakdown with high accuracy.

APPLICATION EXAMPLE 7

According to still another embodiment of the invention, there is provided a moving object including the physical quantity detection circuit.

According to Application Example 7, since the moving object includes the physical quantity detection circuit that can improve the breakdown detection accuracy with respect to the synchronous detection circuit, it is possible to implement a moving object that can detect the occurrence of a breakdown with high accuracy.

The exemplary embodiments of the invention are described in detail below with reference to the drawings. Note that the drawings are used for convenience of explanation. The following exemplary embodiments do not unduly limit the scope of the invention as stated in the claims. All of the elements described below should not necessarily be taken as essential elements of the invention.

1. Physical Quantity Detection Device 1-1. First Embodiment

A first embodiment illustrates an example of a physical quantity detection device (angular velocity detection device) that detects an angular velocity as the physical quantity. Note that the invention can be applied to a device that detects an arbitrary physical quantity (e.g., angular velocity, acceleration, terrestrial magnetism, or pressure).

FIG. 1 illustrates the configuration of an angular velocity detection device according to the first embodiment.

An angular velocity detection device 1 according to the first embodiment includes a gyro sensor element 100 and an angular velocity signal processing circuit 4 (i.e., physical quantity detection circuit).

The gyro sensor element 100 (i.e., physical quantity detection element) includes a vibrating element that includes a drive electrode and a detection electrode, the vibrating element being sealed in a package that is not illustrated in FIG. 1. The package normally has seal-tightness in order to reduce the impedance of the vibrating element and improve the vibration efficiency as much as possible.

The vibrating element of the gyro sensor element 100 may be formed of a piezoelectric material such as a piezoelectric single crystal (e.g., quartz crystal ($SiO_2$), lithium tantalate ($LiTaO_3$), or lithium niobate ($LiNbO_3$)) or a piezoelectric ceramic (e.g., lead zirconate titanate (PZT)), or may have a structure in which a piezoelectric thin film (e.g., zinc oxide (ZnO) or aluminum nitride (AlN)) is disposed on the surface of semiconductor silicon so as to be situated between the drive electrodes.

The vibrating element may have a double-T structure that includes two T-shaped vibrating drive arms, or may have a tuning-fork structure, or may have a tuning-bar structure in the shape of a triangular prism, a quadrangular prism, or a column, for example.

In the first embodiment, the gyro sensor element 100 includes a double-T-shaped vibrating element that is formed using a quartz crystal.

Figure 2:
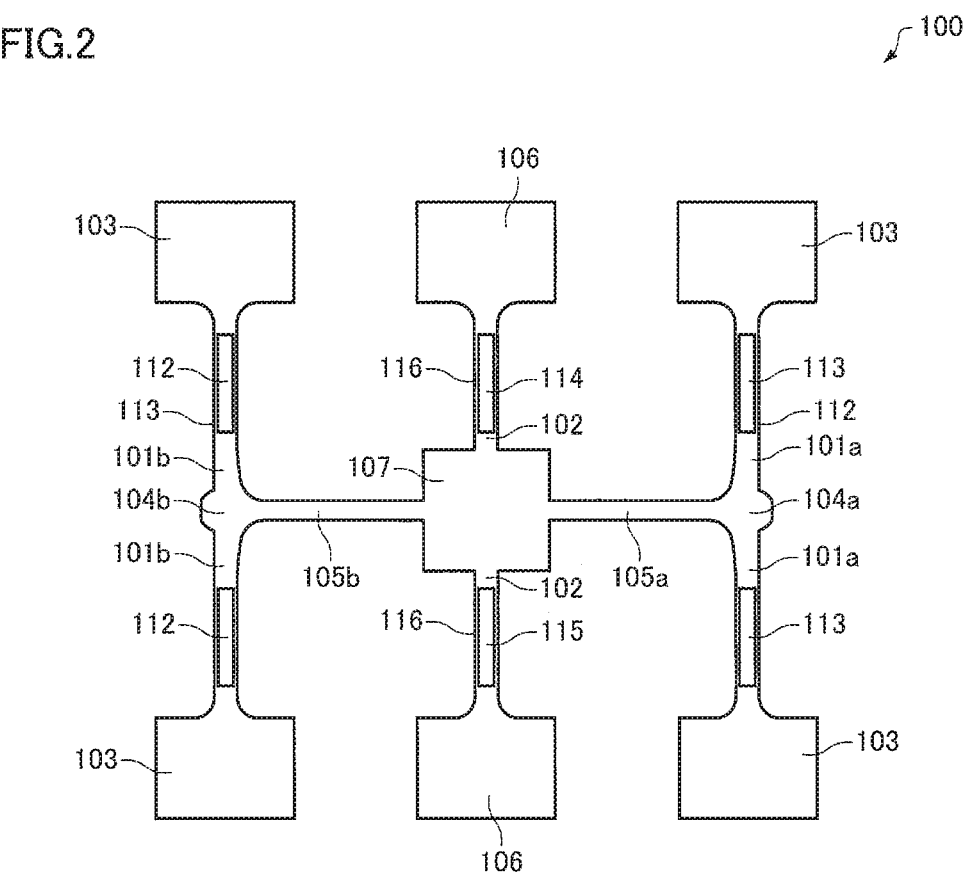
FIG. 2 is a plan view illustrating a vibrating element of a gyro sensor element.

FIG. 2 is a plan view illustrating the vibrating element of the gyro sensor element 100 according to the first embodiment.

The gyro sensor element 100 according to the first embodiment includes a double-T-shaped vibrating element that is formed using a Z-cut quartz crystal substrate. A vibrating element that is formed using a quartz crystal has an advantage in that the angular velocity detection accuracy can be improved since the resonance frequency changes to only a small extent due to a change in temperature. Note that the X-axis, the Y-axis, and the Z-axis in FIG. 2 correspond to the axes of the quartz crystal.

As illustrated in FIG. 2, the vibrating element of the gyro sensor element 100 includes vibrating drive arms 101*a* and 101*b* that extend respectively from drive bases 104*a* and 104*b* in the +Y-axis direction and the −Y-axis direction. Drive electrodes 112 and 113 are respectively formed on the side surface and the upper surface of the vibrating drive arm 101*a*, and drive electrodes 113 and 112 are respectively formed on the side surface and the upper surface of the vibrating drive arm 101*b*. The drive electrodes 112 and 113 are connected to a driver circuit 20 respectively through an external output terminal 11 and an external input terminal 12 of the angular velocity signal processing circuit 4 illustrated in FIG. 1.

The drive bases 104*a* and 104*b* are connected to a rectangular detection base 107 through connection arms 105*a* and 105*b* that respectively extend in the −X-axis direction and the +X-axis direction.

Vibrating detection arms 102 extend from the detection base 107 in the +Y-axis direction and the −Y-axis direction. Detection electrodes 114 and 115 are formed on the upper surface of the vibrating detection arms 102, and common electrodes 116 are formed on the side surface of the vibrating detection arms 102. The detection electrodes 114 and 115 are connected to a detection circuit 30 respectively through external input terminals 13 and 14 of the angular velocity signal processing circuit 4 illustrated in FIG. 1. The common electrodes 116 are grounded.

Figure 3:
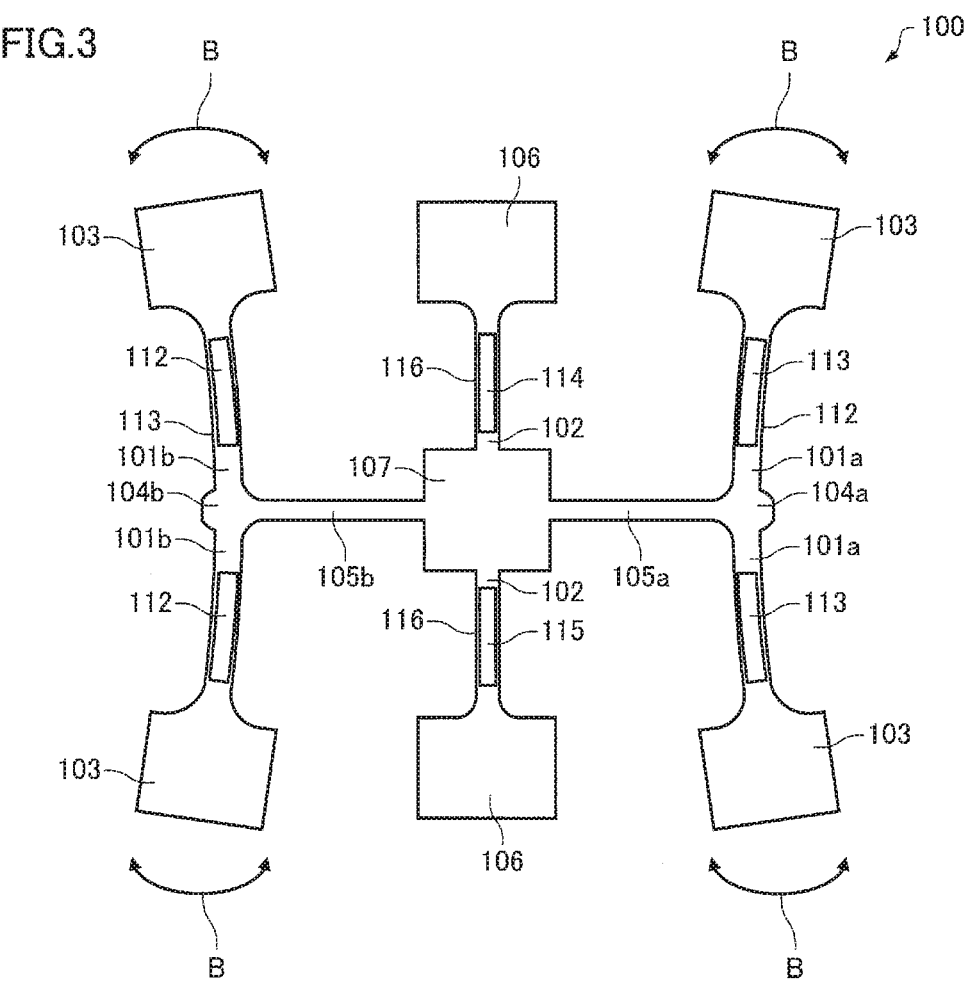
FIG. 3 illustrates the operation of a gyro sensor element.

When an alternating voltage (drive signal) is applied between the drive electrodes 112 and 113 of the vibrating drive arms 101*a* and 101*b*, the vibrating drive arms 101*a* and 101*b* produce flexural vibrations (excited vibrations) so that the ends of the vibrating drive arms 101*a* and 101*b* repeatedly move closer to each other and away from each other (see arrow B) due to an inverse piezoelectric effect (see FIG. 3).

Note that the expression "the vibration energy of the vibrating drive arms is balanced" used herein refers to a case where the magnitude of the vibration energy or the vibration amplitude of each vibrating drive arm is equal when the vibrating drive arms produce flexural vibrations (excited vibrations) in a state in which an angular velocity is not applied to the gyro sensor element.

When an angular velocity around the Z-axis is applied to the vibrating element of the gyro sensor element 100, the vibrating drive arms 101*a* and 101*b* are subjected to a Coriolis force in the direction that is perpendicular to the direction of the flexural vibrations (see arrow B) and the Z-axis. Therefore, the connection arms 105*a* and 105*b* produce vibrations (see arrow C in FIG. 4). The vibrating detection arms 102 produce flexural vibrations (see arrow D) in synchronization with the vibrations (see arrow C) of the connection arms 105*a* and 105*b*.

When the vibration energy of the vibrating drive arms has become imbalanced due to production variations of the gyro sensor element or the like, the excited vibrations of the vibrating drive arms 101*a* and 101*b* cause the vibrating detection arms 102 to produce leakage vibrations. The leakage vibrations are flexural vibrations (see arrow D) in the same manner as the vibrations based on the Coriolis force, but occur in the same phase as the drive signal. The vibrations based on the Coriolis force differ in phase from the driving vibrations by 90°.

An alternating charge based on the flexural vibrations occurs in the detection electrodes 114 and 115 of the vibrating detection arms 102 due to a piezoelectric effect. An alternating charge that is generated based on the Coriolis force changes corresponding to the magnitude of the Coriolis force (i.e., the magnitude of the angular velocity applied to the gyro sensor element 100). On the other hand, an alternating charge that is generated based on the leakage vibrations is independent of the magnitude of the angular velocity applied to the gyro sensor element 100.

In the configuration illustrated in FIG. 2, the detection base 107 is disposed at the center of the vibrating element, and the vibrating detection arms 102 are disposed to extend from the detection base 107 in the +Y-axis direction and the −Y-axis direction in order to improve the balance of the vibrating element. The connection arms 105*a* and 105*b* are disposed to extend from the detection base 107 in the +X-axis direction and the −X-axis direction, and the vibrating drive arms 101*a* and 101*b* are disposed to extend from the connection arms 105*a* and 105*b* in the +Y-axis direction and the −Y-axis direction.

A rectangular weight section 103 that is wider than the vibrating drive arms 101*a* and 101*b* is formed at the end of the vibrating drive arms 101*a* and 101*b*. It is possible to increase the Coriolis force while obtaining the desired resonance frequency using relatively short vibrating arms by forming the weight section 103 at the end of the vibrating drive arms 101*a* and 101*b*. A weight section 106 that is wider than the vibrating detection arms 102 is formed at the end of the vibrating detection arm 102. It is possible to increase the amount of alternating charge that flows through the detection electrodes 114 and 115 by forming the weight section 106 at the end of the vibrating detection arm 102.

The gyro sensor element 100 thus outputs an alternating charge (i.e., an angular velocity detection signal) that is generated based on the Coriolis force and an alternating charge (i.e., a leakage signal) that is generated based on the leakage vibrations of the excited vibrations through the detection electrodes 114 and 115 (detection axis: Z-axis).

Again referring to FIG. 1, the angular velocity signal processing circuit 4 includes the driver circuit 20, the detection circuit 30, a control section 60, an abnormality determination section 70, and a register 80.

The driver circuit 20 generates a drive signal 21 that causes the gyro sensor element 100 to produce excited vibrations, and supplies the drive signal 21 to the drive electrode 112 of the gyro sensor element 100 through the external output terminal 11. The driver circuit 20 receives a drive signal 22 through the external input terminal 12, and feedback-controls the amplitude level of the drive signal 21 so that the amplitude of the drive signal 22 is maintained constant, the drive signal 22 being generated through the drive electrode 113 due to the excited vibrations of the gyro sensor element 100. The driver circuit 20 generates a square-wave voltage signal 24 that is used as a reference for a detection signal 34 that is generated by a synchronous detection circuit 350 included in the detection circuit 30.

The driver circuit 20 includes an I/V conversion circuit (current/voltage conversion circuit) 210, an AC amplifier circuit 220, and a drive current change circuit 230.

The I/V conversion circuit 210 converts a drive current that flows through the vibrating element of the gyro sensor element 100 into an alternating voltage signal.

The alternating voltage signal output from the I/V conversion circuit 210 is input to the AC amplifier circuit 220 and the drive current change circuit 230. The AC amplifier circuit 220 amplifies the alternating voltage signal input thereto, clips the amplified signal to a predetermined voltage value, and outputs the square-wave voltage signal 24. The drive current change circuit 230 changes the amplitude of the square-wave voltage signal 24 based on the level of the alternating voltage signal output from the I/V conversion circuit 210, and controls the AC amplifier circuit 220 so that a constant drive current is maintained. Note that an example of the operation of the drive current change circuit 230 is described later (see "1-1-2. Example 2" and "1-1-3. Example 3").

The square-wave voltage signal 24 is supplied to the drive electrode 112 of the vibrating element of the gyro sensor element 100 through the external output terminal 11. The gyro sensor element 100 continuously produces predetermined driving vibrations (see FIG. 3). It is possible to cause the vibrating drive arms 101a and 101b of the gyro sensor element 100 to produce vibrations at a constant velocity by maintaining a constant drive current. Therefore, the vibration velocity based on which the Coriolis force is produced becomes constant, and the sensitivity is further stabilized.

The detection circuit 30 receives an alternating charge (detection current) 31 generated through the detection electrode 114 of the gyro sensor element 100 through the external input terminal 13, and receives an alternating charge (detection current) 32 generated through the detection electrode 115 of the gyro sensor element 100 through the external input terminal 14. The detection circuit 30 extracts the desired component included in each alternating charge (detection current).

The detection circuit 30 includes charge amplifier circuits 310 and 320, a differential amplifier circuit 330, an AC amplifier circuit 340, the synchronous detection circuit 350, a smoothing circuit 360, a variable amplifier circuit 370, a filter circuit 380, and a phase shift circuit 352.

An alternating charge that includes the angular velocity detection signal and the leakage signal is input to the charge amplifier circuit 310 from the detection electrode 114 of the vibrating element of the gyro sensor element 100 through the external input terminal 13.

An alternating charge that includes the angular velocity detection signal and the leakage signal is input to the charge amplifier circuit 320 from the detection electrode 115 of the vibrating element of the gyro sensor element 100 through the external input terminal 14.

Each of the charge amplifier circuits 310 and 320 converts the alternating charge input thereto into an alternating voltage signal based on a reference voltage Vref. Note that the reference voltage Vref is generated by a reference power supply circuit (not illustrated in the drawings) based on an external power supply voltage input through a power supply input terminal.

The differential amplifier circuit 330 differentially amplifies the signal output from the charge amplifier circuit 310 and the signal output from the charge amplifier circuit 320. The differential amplifier circuit 330 removes an in-phase component, and amplifies an out-of-phase component.

The AC amplifier circuit 340 amplifies the signal output from the differential amplifier circuit 330. The signal output from the AC amplifier circuit 340 includes the angular velocity detection signal and the leakage signal, and is input to the synchronous detection circuit 350 as a detection target signal 36.

The synchronous detection circuit 350 performs a synchronous detection process on the detection target signal 36 based on the detection signal 34. The synchronous detection circuit 350 may be implemented by a switch circuit that selects the signal output from the AC amplifier circuit 340 when the voltage level of the detection signal 34 is higher than the reference voltage Vref, and selects a signal obtained by inverting the signal output from the AC amplifier circuit 340 with respect to the reference voltage Vref when the voltage level of the detection signal 34 is lower than the reference voltage Vref.

The phase shift circuit 352 generates the detection signal 34 that has a phase difference with respect to the square-wave voltage signal 24. Note that an example of the operation of the phase shift circuit 352 is described later (see "1-1-1. Example 1" and "1-1-3. Example 3").

The signal output from the synchronous detection circuit 350 is smoothed into a direct voltage signal by the smoothing circuit 360, and input to the variable amplifier circuit 370.

The variable amplifier circuit 370 adjusts the detection sensitivity by amplifying (or attenuating) the signal (direct voltage signal) output from the smoothing circuit 360 by a preset amplification factor (or attenuation factor). The signal that has been amplified (or attenuated) by the variable amplifier circuit 370 is input to the filter circuit 380.

The filter circuit 380 limits the frequency of the signal output from the variable amplifier circuit 370 to a frequency band that is appropriate for the application, and generates an angular velocity detection signal 33. The angular velocity detection signal 33 is output to the outside through an external output terminal 17 while being input to the abnormality determination section 70.

The control section 60 outputs a control signal 64 based on a control signal 62 input from the outside to control the phase shift circuit 352. The control section 60 outputs a control signal 66 based on the control signal 62 input from the outside to control the drive current change circuit 230. The control section 60 may be implemented by a dedicated logic circuit or a general-purpose central processing unit (CPU), for example.

The abnormality determination section 70 determines whether or not the angular velocity detection device 1 (physical quantity detection device) is abnormal based on the signal output from the synchronous detection circuit 350, and outputs an abnormality determination signal 72 that represents the determination result to an external output terminal 18. In the example illustrated in FIG. 1, the signal output from the synchronous detection circuit 350 is input to the abnormality determination section 70 through the smoothing circuit 360, the variable amplifier circuit 370, and the filter circuit 380.

In the first embodiment, when it has been determined that the angular velocity detection device 1 (physical quantity detection device) is abnormal, an error signal that represents that the angular velocity detection device 1 (physical quantity detection device) is abnormal may be output to the external output terminal 18 as the abnormality determination signal 72. In this case, other circuit blocks and devices can easily utilize the error signal.

Note that an example of the operation of the abnormality determination section 70 is described later (see "1-1-1. Example 1", "1-1-2. Example 2", and "1-1-3. Example 3").

In the first embodiment, the angular velocity signal processing circuit 4 includes the register 80. The register 80 can output information stored therein to the outside as a digital signal 82 through an external terminal 19. The abnormality determination section 70 may write error information into the register 80 when the abnormality determination section 70 has determined that the angular velocity detection device 1 (physical quantity detection device) is abnormal based on the signal output from the synchronous detection circuit 350. In the example illustrated in FIG. 1, the abnormality determination section 70 writes the error information into the register 80 by outputting an error information signal 74 to the register 80. When the angular velocity signal processing circuit 4 includes the register 80, other circuit blocks and devices can easily utilize the error information.

Note that the angular velocity detection device 1 may have a configuration in which some of the elements described above are omitted, or may have a configuration in which an additional element is further provided.

1-1-1. Example 1

Figure 5:
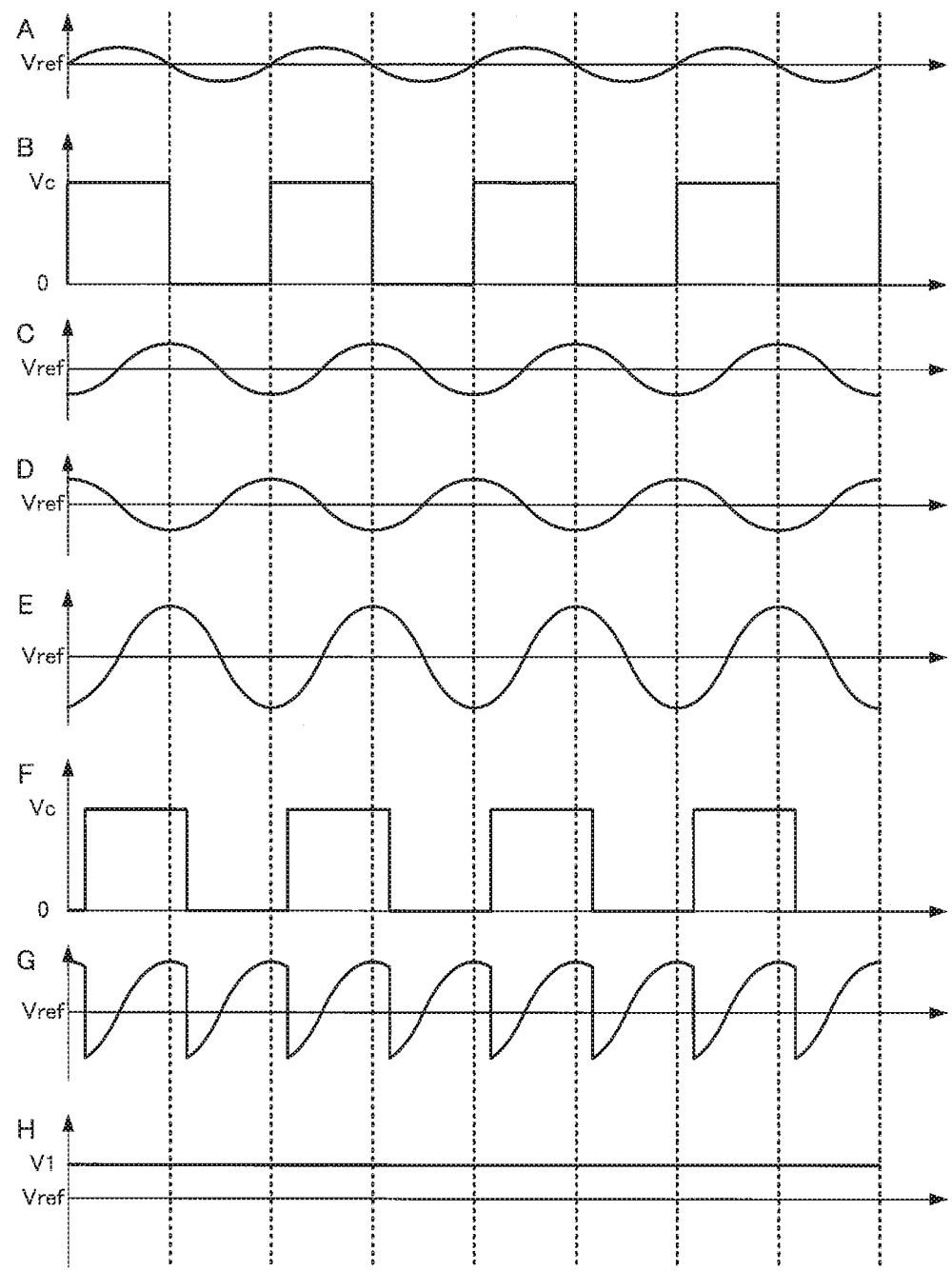
FIG. 5 illustrates an example of a signal waveform when an angular velocity detection device stands still.

FIG. 5 illustrates an example of a signal waveform when the angular velocity detection device 1 stands still. In FIG. 5, the horizontal axis indicates time, and the vertical axis indicates voltage.

An alternating voltage having a constant frequency that is obtained by converting a current that is fed back from the drive electrode 113 of the vibrating element of the gyro sensor element 100 is generated at the output (point A) of the I/V conversion circuit 210 in a state in which the vibrating element of the gyro sensor element 100 vibrates. Specifically, a sine-wave voltage signal having a constant frequency is generated at the output (point A) of the I/V conversion circuit 210.

A square-wave voltage signal having a constant amplitude Vc that is obtained by amplifying the signal output from the I/V conversion circuit 210 (signal at the point A) is generated at the output (point B) of the AC amplifier circuit 220.

When an angular velocity is not applied to the gyro sensor element 100, an angular velocity detection signal does not flow through the detection electrodes 114 and 115 of the vibrating element of the gyro sensor element 100, but a leakage signal flows through the detection electrodes 114 and 115 of the vibrating element of the gyro sensor element 100.

The leakage signals (alternating charge) that flow through the detection electrodes 114 and 115 of the gyro sensor element 100 are converted into alternating voltage signals by the charge amplifier circuits 310 and 320. The phase of the alternating voltage signal output from the charge amplifier circuit 310 is the reverse of the phase of the alternating voltage signal output from the charge amplifier circuit 320. Therefore, sine-wave voltage signals having the same frequency as that of the signal output from the AC amplifier circuit 220 (signal at the point B) are generated at the output (point C) of the charge amplifier circuit 310 and the output (point D) of the charge amplifier circuit 320. The phase of the signal output from the charge amplifier circuit 310 (signal at the point C) is shifted from the phase of the signal output from the AC amplifier circuit 220 (signal at the point B) by 90°. The phase of the signal output from the charge amplifier circuit 320 (signal at the point D) is the reverse of (i.e., is shifted by 180° from) the phase of the signal output from the charge amplifier circuit 310 (signal at the point C).

The signals output from the charge amplifier circuits 310 and 320 (signals at the points C and D) are differentially amplified by the differential amplifier circuit 330, and a sine-wave voltage signal that has the same frequency and the same phase as those of the sine-wave voltage signal generated at the output (point C) of the charge amplifier circuit 310 is generated at the output (point E) of the AC amplifier circuit 340. The sine-wave voltage signal that is generated at the output (point E) of the AC amplifier circuit 340 corresponds to the leakage signals that flow through the detection electrodes 114 and 115 of the vibrating element of the gyro sensor element 100.

The signal output from the AC amplifier circuit 340 (signal at the point E) is synchronously detected by the synchronous detection circuit 350 based on the detection signal 34. The detection signal 34 (i.e., the signal output from the phase shift circuit 352 (signal at the point F)) is a square-wave voltage signal that has a phase difference ($\Delta\phi$) corresponding to the phase shift amount with respect to the square-wave voltage signal output from the AC amplifier circuit 220 (signal at the point B). Since the phase of the signal output from the AC amplifier circuit 340 (signal at the point E) is shifted from the phase of the detection signal 34 (i.e., the signal output from the phase shift circuit 352 (signal at the point F)) by 90°−$\Delta\phi$, the signal output from the synchronous detection circuit 350 (signal at the point G) is characterized in that the integral quantity of the voltage that is higher than the reference voltage Vref is not equal to the integral quantity of the voltage that is lower than the reference voltage Vref. The difference in integral quantity changes corresponding to the signal level. Therefore, a direct voltage signal (i.e., angular velocity detection signal 33) that has a voltage value V1 corresponding to the level of the leakage signal and the phase shift amount is generated at the output (point H) of the filter circuit 380. Note that the detection signal corresponding to the magnitude of the angular velocity can be extracted by setting the phase difference $\Delta\phi$ to 0°.

In Example 1, the phase shift circuit 352 switches the phase difference between the detection signal 34 and the detection target signal 36 between a first phase difference $\Delta\phi1$ and a second phase difference $\Delta\phi2$ that differs from the first phase difference $\Delta\phi1$ based on the control signal 64 so that at least part of the leakage signal is output through the synchronous detection process performed by the synchronous detection circuit 350.

The expected output value from the synchronous detection circuit 350 can be changed by switching the phase difference between the detection signal 34 and the detection target signal 36 between the first phase difference $\Delta\phi1$ and the second phase difference $\Delta\phi2$.

Figure 6A:
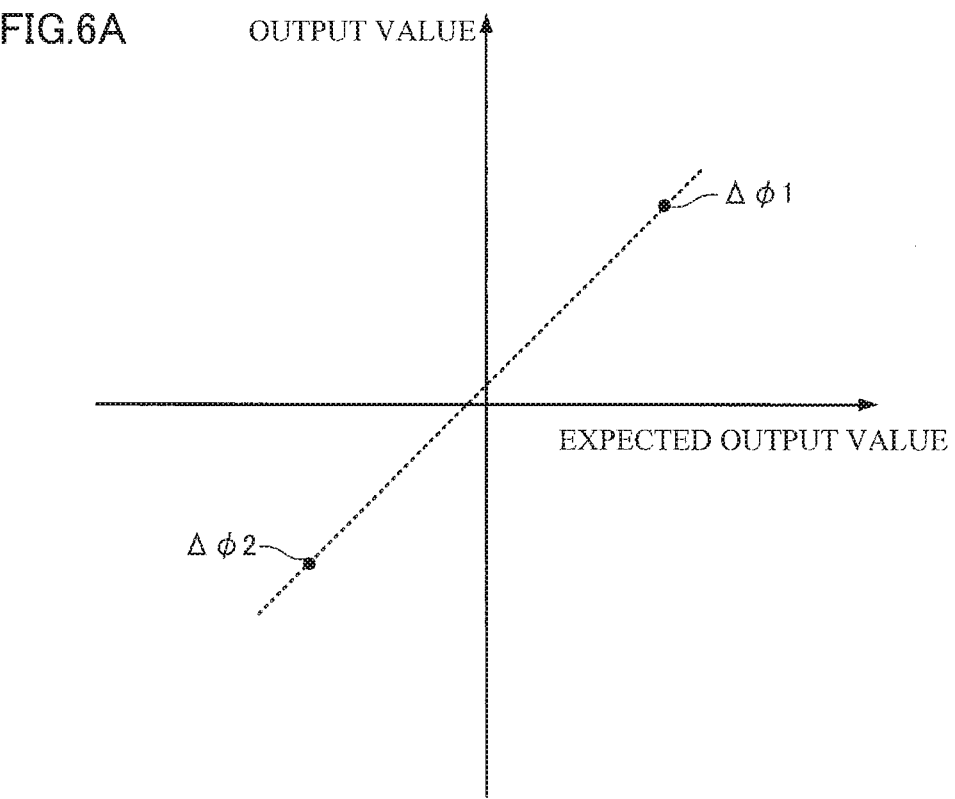
FIGS. 6A and 6B are graphs illustrating an example of the relationship between an expected output value and an actual output value in Example 1.
Figure 6B:
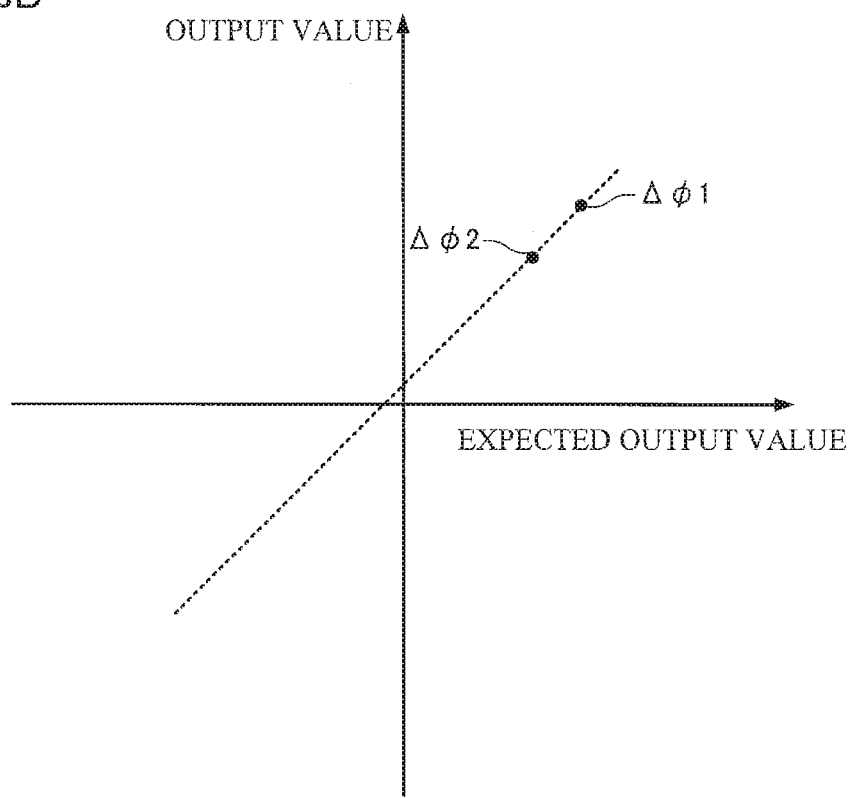

FIGS. 6A and 6B are graphs illustrating an example of the relationship between the expected output value and the actual output value according to Example 1. In FIGS. 6A and 6B, the horizontal axis indicates the expected output value, and the vertical axis indicates the actual output value.

FIG. 6A illustrates an example in which the first phase difference $\Delta\phi1$ is set to 90°, and the second phase difference $\Delta\phi2$ is set to −90°. FIG. 6B illustrates an example in which the first phase difference $\Delta\phi1$ is set to 90°, and the second phase difference $\Delta\phi2$ is set to 45°.

According to Example 1, it is possible to change the expected output value from the synchronous detection circuit 350 by switching the phase difference between the detection signal 34 and the detection target signal 36 between the first phase difference $\Delta\phi1$ and the second phase difference $\Delta\phi2$. Therefore, when the synchronous detection circuit 350 has broken down, and outputs a constant value, it is possible to detect that the synchronous detection circuit 350 has broken down. This makes it possible to implement the angular velocity signal processing circuit 4 (physical quantity detection circuit) and the angular velocity detection device 1 (physical quantity detection device) that can improve the breakdown detection accuracy with respect to the synchronous detection circuit 350.

In Example 1, the abnormality determination section 70 determines whether or not the angular velocity detection device 1 (physical quantity detection device) is abnormal based on the signal output from the synchronous detection circuit 350. For example, the abnormality determination section 70 may determine that the angular velocity detection device 1 (physical quantity detection device) is normal when the difference between the value output from the filter circuit 380 when the phase difference is set to the first phase difference Δϕ1, and the value output from the filter circuit 380 when the phase difference is set to the second phase difference Δϕ2, is within a predetermined range, and may determine that the angular velocity detection device 1 (physical quantity detection device) is abnormal when the difference between the value output from the filter circuit 380 when the phase difference is set to the first phase difference Δϕ1, and the value output from the filter circuit 380 when the phase difference is set to the second phase difference Δϕ2, is outside the predetermined range. Alternatively, when the expected output value (horizontal axis) and the actual output value (vertical axis) are plotted, the abnormality determination section 70 may determine that the angular velocity detection device 1 (physical quantity detection device) is normal when the slope or the intercept of a straight line that connects the value output from the filter circuit 380 when the phase difference is set to the first phase difference Δϕ1, and the value output from the filter circuit 380 when the phase difference is set to the second phase difference Δϕ2, is within a predetermined range, and may determine that the angular velocity detection device 1 (physical quantity detection device) is abnormal when the slope or the intercept of a straight line that connects the value output from the filter circuit 380 when the phase difference is set to the first phase difference Δϕ1, and the value output from the filter circuit 380 when the phase difference is set to the second phase difference Δϕ2, is outside the predetermined range, for example.

According to the first embodiment, since the expected output value from the synchronous detection circuit 350 can be changed, it is possible to implement the angular velocity signal processing circuit 4 (physical quantity detection circuit) and the angular velocity detection device 1 (physical quantity detection device) that can improve the breakdown detection accuracy with respect to the synchronous detection circuit 350.

When an angular velocity is applied to the angular velocity detection device 1, the angular velocity detection signal 33 has a voltage value obtained by superimposing the voltage value corresponding to the level of the leakage signal on the voltage value corresponding to the magnitude of the angular velocity. This makes it difficult to determine whether or not the angular velocity detection device 1 is abnormal. Therefore, it is desirable to determine whether or not the angular velocity detection device 1 is abnormal in a state in which an angular velocity is not applied to the angular velocity detection device 1 (e.g., in a state in which the angular velocity detection device 1 stands still). For example, when the angular velocity detection device 1 according to the first embodiment is installed in a car, whether or not the angular velocity detection device 1 is abnormal may be determined during a primary check when the engine of the car is started.

1-1-2. Example 2

In Example 2, the drive current change circuit 230 switches the current value of the drive signal between a first current value I1 and a second current value I2 that differs from the first current value I1 based on the control signal 66.

The expected output value from the synchronous detection circuit 350 can be changed by switching the current value of the drive signal between the first current value I1 and the second current value I2.

FIG. 7 is a graph illustrating an example of the relationship between the expected output value and the actual output value according to Example 2. In FIG. 7, the horizontal axis indicates the expected output value, and the vertical axis indicates the actual output value.

FIG. 7 illustrates an example in which the second current value I2 is twice the first current value I1.

According to Example 2, it is possible to change the expected output value from the synchronous detection circuit 350 by switching the current value of the drive signal between the first current value I1 and the second current value I2. Therefore, when the synchronous detection circuit 350 has broken down, and outputs a constant value, it is possible to detect that the synchronous detection circuit 350 has broken down. This makes it possible to implement the angular velocity signal processing circuit 4 (physical quantity detection circuit) and the angular velocity detection device 1 (physical quantity detection device) that can improve the breakdown detection accuracy with respect to the synchronous detection circuit 350.

In Example 2, the abnormality determination section 70 determines whether or not the angular velocity signal processing circuit 4 (physical quantity detection circuit) is abnormal based on the signal output from the synchronous detection circuit 350. For example, the abnormality determination section 70 may determine that the angular velocity signal processing circuit 4 (physical quantity detection circuit) is normal when the difference between the value output from the filter circuit 380 when the current value of the drive signal is set to the first current value I1, and the value output from the filter circuit 380 when the current value of the drive signal is set to the second current value I2, is within a predetermined range, and may determine that the angular velocity signal processing circuit 4 (physical quantity detection circuit) is abnormal when the difference between the value output from the filter circuit 380 when the current value of the drive signal is set to the first current value I1, and the value output from the filter circuit 380 when the current value of the drive signal is set to the second current value I2, is outside the predetermined range. Alternatively, when the expected output value (horizontal axis) and the actual output value (vertical axis) are plotted, the abnormality determination section 70 may determine that the angular velocity signal processing circuit 4 (physical quantity detection circuit) is normal when the slope or the intercept of a straight line that connects the value output from the filter circuit 380 when the current value of the drive signal is set to the first current value I1, and the value output from the filter circuit 380 when the current value of the drive signal is set to the second current value I2, is within a predetermined range, and may determine that the angular velocity signal processing circuit 4 (physical quantity detection circuit) is abnormal when the slope or the intercept of a straight line that connects the value output from the filter circuit 380 when the current value of the drive signal is set to the first current value I1, and the value output from the filter circuit 380 when the current value of the drive signal is set to the second current value I2, is outside the predetermined range, for example.

According to the first embodiment, since the expected output value from the synchronous detection circuit 350 can be changed, it is possible to implement the angular velocity signal processing circuit 4 (physical quantity detection circuit) and the angular velocity detection device 1 (physical quantity detection device) that can improve the breakdown detection accuracy with respect to the synchronous detection circuit 350.

When an angular velocity is applied to the angular velocity detection device 1, the angular velocity detection signal 33 has a voltage value obtained by superimposing the voltage value corresponding to the level of the leakage signal on the voltage value corresponding to the magnitude of the angular velocity. This makes it difficult to determine whether or not the angular velocity detection device 1 is abnormal. Therefore, it is desirable to determine whether or not the angular velocity detection device 1 is abnormal in a state in which an angular velocity is not applied to the angular velocity detection device 1 (e.g., in a state in which the angular velocity detection device 1 stands still). For example, when the angular velocity detection device 1 according to the first embodiment is installed in a car, whether or not the angular velocity detection device 1 is abnormal may be determined during a primary check when the engine of the car is started.

1-1-3. Example 3

In Example 3, the phase shift circuit 352 switches the phase difference between the detection signal 34 and the detection target signal 36 between a first phase difference $\Delta\phi1$ and a second phase difference $\Delta\phi2$ that differs from the first phase difference $\Delta\phi1$ based on the control signal 64 so that at least part of the leakage signal is output through the synchronous detection process performed by the synchronous detection circuit 350. The drive current change circuit 230 switches the current value of the drive signal between a first current value I1 and a second current value I2 that differs from the first current value I1 based on the control signal 66 at least when the phase difference is set to the first phase difference $\Delta\phi1$ or when the phase difference is set to the second phase difference $\Delta\phi2$.

FIG. 8 is a graph illustrating an example of the relationship between the expected output value and the actual output value according to Example 3. In FIG. 8, the horizontal axis indicates the expected output value, and the vertical axis indicates the actual output value.

FIG. 8 illustrates an example in which the first phase difference $\Delta\phi1$ is set to 90°, and the second phase difference $\Delta\phi2$ is set to −90°. FIG. 8 illustrates an example in which the second current value I2 is twice the first current value I1. FIG. 8 illustrates an example in which the current value of the drive signal is switched between the first current value I1 and the second current value I2 when the phase difference is set to the first phase difference $\Delta\phi1$, and when the phase difference is set to the second phase difference $\Delta\phi2$.

According to Example 3, it is possible to change the expected output value from the synchronous detection circuit 350 by switching the phase difference between the detection signal 34 and the detection target signal 36 between the first phase difference $\Delta\phi1$ and the second phase difference $\Delta\phi2$. According to Example 3, it is possible to change the expected output value from the synchronous detection circuit 350 by switching the current value of the drive signal between the first current value I1 and the second current value I2. Therefore, when the synchronous detection circuit 350 has broken down, and outputs a constant value, it is possible to detect that the synchronous detection circuit 350 has broken down. This makes it possible to implement the angular velocity signal processing circuit 4 (physical quantity detection circuit) and the angular velocity detection device 1 (physical quantity detection device) that can improve the breakdown detection accuracy with respect to the synchronous detection circuit 350.

In Example 3, the abnormality determination section 70 determines whether or not the angular velocity signal processing circuit 4 (physical quantity detection circuit) is abnormal based on the signal output from the synchronous detection circuit 350. For example, when the expected output value (horizontal axis) and the actual output value (vertical axis) are plotted, the abnormality determination section 70 may determine that the angular velocity signal processing circuit 4 (physical quantity detection circuit) is normal when the slope or the intercept of a fitting straight line with respect to each output value is within a predetermined range, and may determine that the angular velocity signal processing circuit 4 (physical quantity detection circuit) is abnormal when the slope or the intercept of a fitting straight line with respect to each output value is outside the predetermined range.

According to the first embodiment, since the expected output value from the synchronous detection circuit 350 can be changed, it is possible to implement the angular velocity signal processing circuit 4 (physical quantity detection circuit) and the angular velocity detection device 1 (physical quantity detection device) that can improve the breakdown detection accuracy with respect to the synchronous detection circuit 350.

When an angular velocity is applied to the angular velocity detection device 1, the angular velocity detection signal 33 has a voltage value obtained by superimposing the voltage value corresponding to the level of the leakage signal on the voltage value corresponding to the magnitude of the angular velocity. This makes it difficult to determine whether or not the angular velocity detection device 1 is abnormal. Therefore, it is desirable to determine whether or not the angular velocity detection device 1 is abnormal in a state in which an angular velocity is not applied to the angular velocity detection device 1 (e.g., in a state in which the angular velocity detection device 1 stands still). For example, when the angular velocity detection device 1 according to the first embodiment is installed in a car, whether or not the angular velocity detection device 1 is abnormal may be determined during a primary check when the engine of the car is started.

1-2. Second Embodiment

Figure 9:
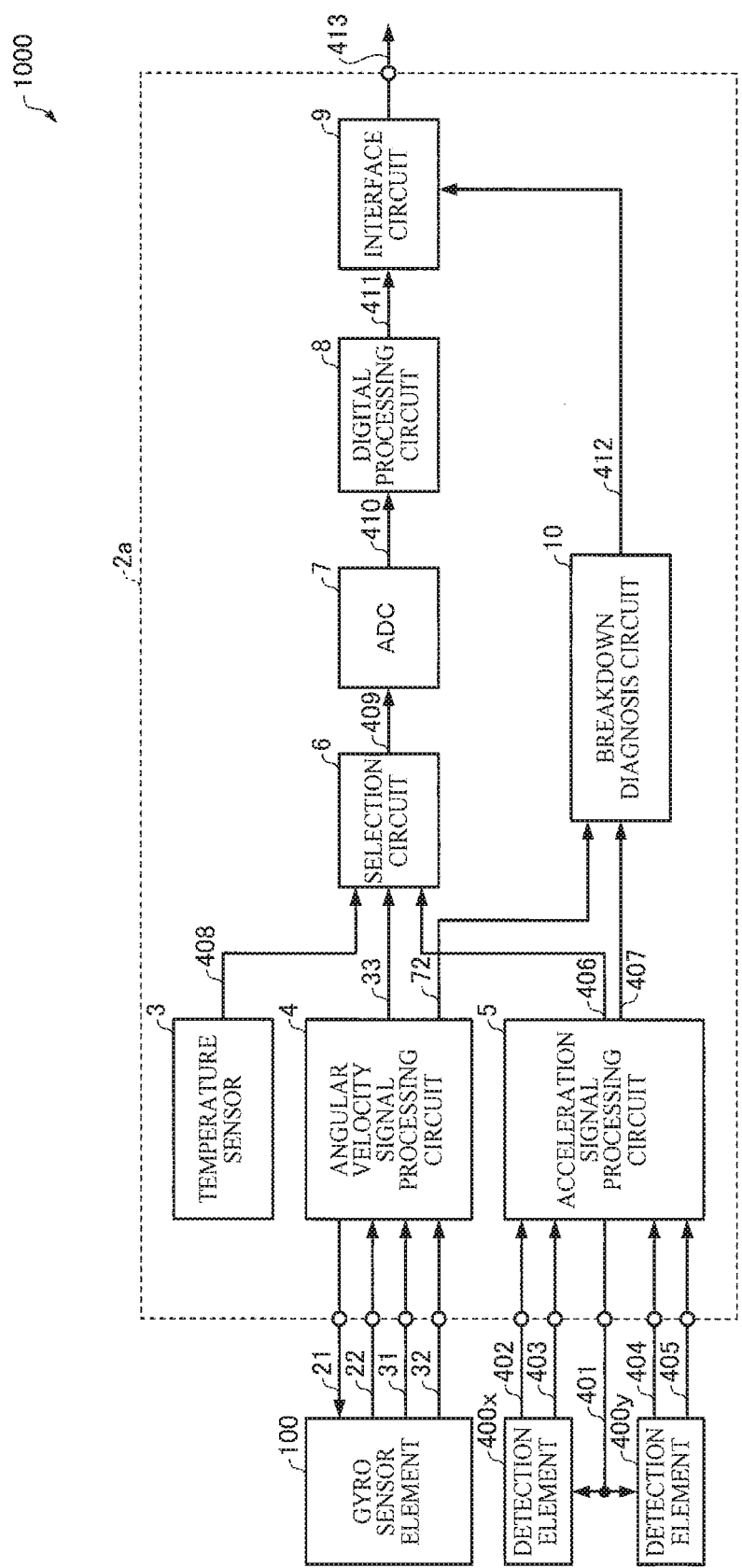
FIG. 9 is a functional block diagram illustrating a physical quantity detection device according to the second embodiment.

FIG. 9 is a functional block diagram illustrating a physical quantity detection device 1000 according to a second embodiment. Note that the same elements as those described above in connection with the first embodiment are indicated by the same symbols (reference numerals), and detailed description thereof is omitted.

The physical quantity detection device 1000 detects a uniaxial angular velocity and biaxial accelerations as the physical quantity. The physical quantity detection device 1000 includes the gyro sensor element 100 and the angular velocity signal processing circuit 4 as elements that detect an angular velocity. The physical quantity detection device 1000 includes a detection element 400x, a detection element 400y, and an acceleration signal processing circuit 5 as elements that detect an acceleration. The physical quantity detection device 1000 includes a temperature sensor 3 in order to perform a correction based on temperature.

The physical quantity detection device 1000 according to the second embodiment further includes a selection circuit 6, an analog-to-digital converter (ADC) 7, a digital processing circuit 8, an interface circuit 9, and a breakdown diagnosis circuit 10.

In the second embodiment, the elements other than the gyro sensor element 100, the detection element 400x, and the detection element 400y are included in a signal processing IC (integrated circuit device) 2a. Note that the physical quantity detection device 1000 according to the second embodiment may have a configuration in which some of these elements are omitted, or may have a configuration in which an additional element is further provided.

The temperature sensor 3 outputs a temperature signal 408 corresponding to the temperature to the selection circuit 6.

The angular velocity signal processing circuit 4 outputs an angular velocity detection signal 33 corresponding to the angular velocity to the selection circuit 6. The angular velocity signal processing circuit 4 outputs an error information signal 25 to the breakdown diagnosis circuit 10.

The detection element 400x and the detection element 400y are implemented by a capacitance-type acceleration detection element. The detection element 400x receives a carrier signal 401 from the acceleration signal processing circuit 5, and differentially outputs a detection signal 402 and a detection signal 403 corresponding to the detected acceleration to the acceleration signal processing circuit 5. The detection element 400y receives the carrier signal 401 from the acceleration signal processing circuit 5, and differentially outputs a detection signal 404 and a detection signal 405 corresponding to the detected acceleration to the acceleration signal processing circuit 5.

The acceleration signal processing circuit 5 outputs an acceleration signal 406 corresponding to the acceleration to the selection circuit 6 based on the detection signals 402 to 405. The acceleration signal processing circuit 5 outputs an error information signal 407 that represents information about an abnormality that has occurred in the acceleration signal processing circuit 5 to the breakdown diagnosis circuit 10.

The selection circuit 6 sequentially selects one signal from the input signals, and outputs the selected signal (signal 409) to the ADC 7.

The ADC 7 converts the input signal into a digital signal, and outputs the digital signal (signal 410) to the digital processing circuit 8.

The digital processing circuit 8 performs various digital processes on the input signal, and outputs the resulting signal (signal 411) to the interface circuit 9. Examples of the digital process include a filtering process, a process that corrects temperature characteristics, and the like.

The breakdown diagnosis circuit 10 determines whether or not an abnormality has occurred in at least one of the angular velocity signal processing circuit 4, the acceleration signal processing circuit 5, the gyro sensor element 100, the detection element 400x, and the detection element 400y based on the input signal, and outputs a signal 412 that represents the determination result to the interface circuit 9.

The interface circuit 9 converts the input signal into a signal having a predetermined communication format, and outputs the resulting signal (signal 413) to the outside.

The physical quantity detection device 1000 according to the second embodiment achieves the same advantageous effects as those described above in connection with the first embodiment for the same reasons as those described above in connection with the first embodiment.

2. Electronic Device

Figure 10:
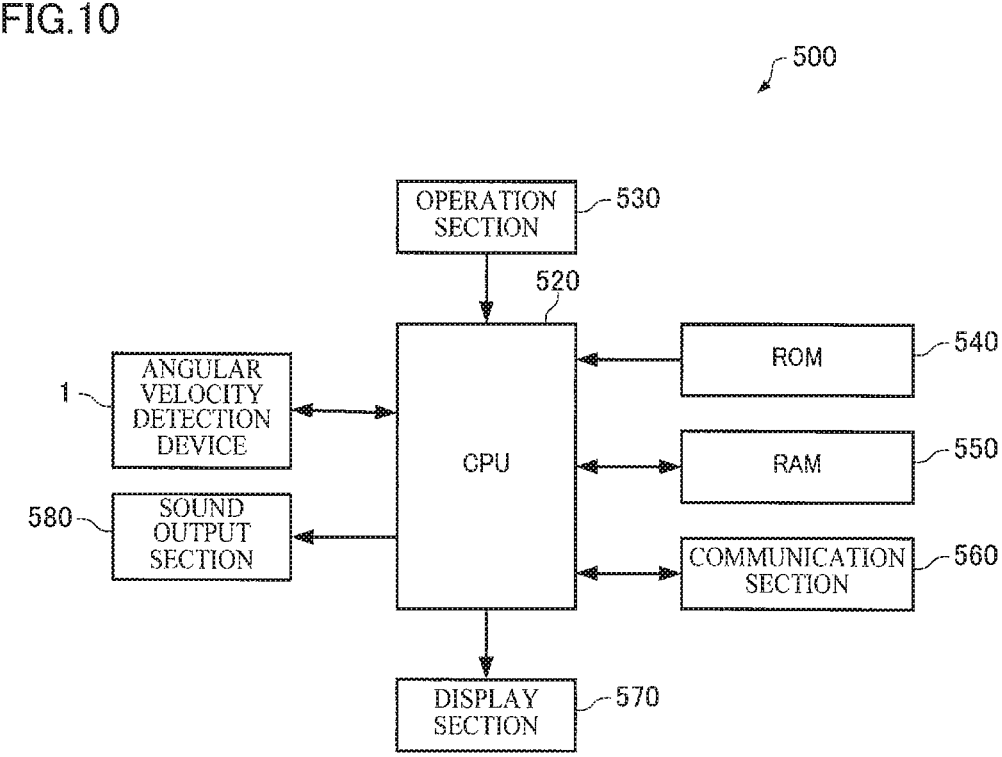
FIG. 10 is a functional block diagram illustrating an electronic device according to one embodiment of the invention.

FIG. 10 is a functional block diagram illustrating an electronic device 500 according to one embodiment of the invention. Note that the same elements as those described above in connection with each embodiment are indicated by the same symbols (reference numerals), and detailed description thereof is omitted.

The electronic device 500 according to one embodiment of the invention includes the angular velocity signal processing circuit 4 (physical quantity detection circuit). In the example illustrated in FIG. 10, the electronic device 500 according to one embodiment of the invention includes the angular velocity detection device 1 that includes the angular velocity signal processing circuit 4 (physical quantity detection circuit), a central processing unit (CPU) 520, an operation section 530, a read-only memory (ROM) 540, a random access memory (RAM) 550, a communication section 560, a display section 570, and a sound output section 580. Note that the electronic device 500 may have a configuration in which some of the elements (sections) illustrated in FIG. 10 are omitted or changed, or may have a configuration in which an additional element is further provided.

The CPU 520 performs a calculation process and a control process according to a program stored in the ROM 540 or the like using a clock pulse output from a clock signal generation circuit (not illustrated in the drawings). More specifically, the CPU 520 performs various processes based on an operation signal from the operation section 530, a process that controls the communication section 560 for performing data communication with the outside, a process that transmits a display signal for displaying various types of information on the display section 570, a process that causes the sound output section 580 to output various types of sound, and the like.

The operation section 530 is an input device that is implemented by an operation key, a button switch, and the like. The operation section 530 outputs the operation signal corresponding to the operation performed by the user to the CPU 520.

The ROM 540 stores a program, data, and the like that are necessary for the CPU 520 to perform the calculation process and the control process.

The RAM 550 is used as a work area for the CPU 520. The RAM 550 temporarily stores a program and data read from the ROM 540, data input from the operation section 530, the results of calculations performed by the CPU 520 according to a program, and the like.

The communication section 560 performs a control process for implementing data communication between the CPU 520 and an external device.

The display section 570 is a display device that is implemented by a liquid crystal display (LCD), an electrophoretic display, or the like, and displays various types of information based on the display signal input from the CPU 520.

The sound output section 580 is a device (e.g., speaker) that outputs sound.

When the error signal that represents that the angular velocity detection device 1 is abnormal has been received from the angular velocity detection device 1, the CPU 520 may transmit a command to the angular velocity detection device 1 in order to specify the part in which a breakdown has occurred, the command instructing the angular velocity signal processing circuit 4 described above in connection with the first or second embodiment to determine whether or not the synchronous detection circuit 350 has broken down.

Since the electronic device 500 includes the angular velocity signal processing circuit 4 (physical quantity detection circuit) that can improve the breakdown detection accuracy with respect to the synchronous detection circuit 350, the electronic device 500 can detect the occurrence of a breakdown with high accuracy.

Various electronic devices may be used as the electronic device 500. Examples of the electronic device 500 include a personal computer (e.g., mobile personal computer, laptop personal computer, and tablet personal computer), a mobile terminal such as a mobile phone, a digital camera, an inkjet ejecting device (e.g., inkjet printer), a storage area network device such as a router and a switch, a local area network device, a mobile terminal base station device, a TV, a video camera, a video recorder, a car navigation system, a pager, an electronic notebook (that may be provided with a communication function), an electronic dictionary, a calculator, an electronic game device, a game controller, a word processor, a work station, a TV phone, a security TV monitor, electronic binoculars, a point-of-sale (POS) terminal, a medical device (e.g., electronic clinical thermometer, sphygmomanometer, blood glucose meter, electrocardiograph, ultrasonograph, and electronic endoscope), a fish detector, a measurement device, an instrument (e.g., vehicular instrument, flight instrument, and nautical instrument), a wattmeter, a flight simulator, a head-mounted display, a motion trace device, a motion tracking device, a motion controller, a pedestrian dead reckoning (PDR) device, and the like.

Figure 11:
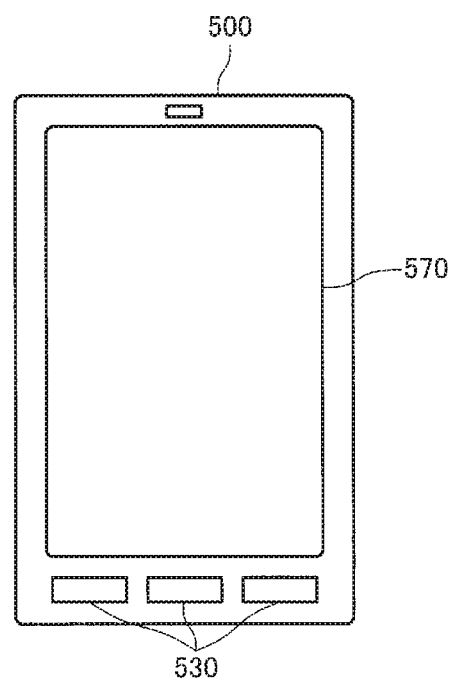
FIG. 11 illustrates an external appearance of a smartphone as an example of an electronic device according to one embodiment of the invention.

FIG. 11 illustrates an external appearance of a smartphone as an example of the electronic device 500. The smartphone (i.e., electronic device 500) includes buttons (i.e., operation section 530) and an LCD (i.e., display section 570). Since the smartphone (i.e., electronic device 500) includes the angular velocity signal processing circuit 4 (physical quantity detection circuit) that can improve the breakdown detection accuracy with respect to the synchronous detection circuit 350, the smartphone (i.e., electronic device 500) can detect the occurrence of a breakdown with high accuracy.

3. Moving Object

Figure 12:
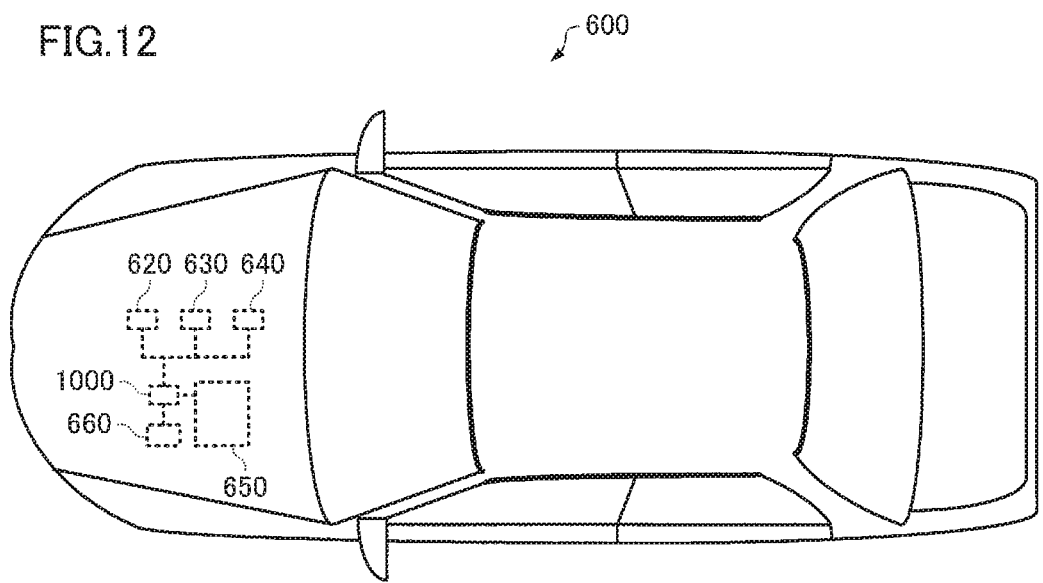
FIG. 12 is a top view illustrating an example of a moving object according to one embodiment of the invention.

FIG. 12 is a top view illustrating a moving object 600 according to one embodiment of the invention. Note that the same elements as those described above in connection with each embodiment are indicated by the same symbols (reference numerals), and detailed description thereof is omitted.

The moving object 600 according to one embodiment of the invention includes the physical quantity detection device 1000. In the example illustrated in FIG. 12, the moving object 600 includes controllers 620, 630, and 640 that control an engine system, a brake system, a keyless entry system, and the like, a battery 650, and a backup battery 660. Note that the moving object 600 may have a configuration in which some of the elements (sections) illustrated in FIG. 12 are omitted or changed, or may have a configuration in which an additional element is further provided.

Since the moving object 600 includes the physical quantity detection device 1000 that can improve the breakdown detection accuracy with respect to the synchronous detection circuit 350, the moving object 600 can detect the occurrence of a breakdown with high accuracy.

Various moving objects may be used as the moving object 600. Examples of the moving object 600 include an automobile (including an electric vehicle), a flying machine (e.g., jet plane and helicopter), a ship, a rocket, a satellite, and the like.

The invention is not limited to the embodiments described above. Various modifications and variations may be made without departing from the scope of the invention.

The embodiments and the modifications described above are merely examples, and the invention is not limited thereto. For example, the embodiments and the modifications described above may be appropriately combined.

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

The entire disclosure of Japanese Patent Application No. 2015-219725, filed on Nov. 9, 2015, is expressly incorporated by reference herein.

What is claimed is:

1. A physical quantity detection circuit comprising:
   a synchronous detection circuit that performs a synchronous detection process on a detection target signal based on a detection signal, the detection target signal including a physical quantity detection signal and a leakage signal from a physical quantity detection element, the physical quantity detection element vibrating based on a drive signal to generate the physical quantity detection signal corresponding to a magnitude of a physical quantity, and the leakage signal of vibrations based on the drive signal; and
   a phase shift circuit that switches a phase difference between the detection signal and the detection target signal, between a first phase difference and a second phase difference that differs from the first phase difference, so that at least part of the leakage signal is output through the synchronous detection process even when the phase difference is set to the first phase difference or is set to the second phase difference,
   the physical quantity being an angular velocity.

2. The physical quantity detection circuit as defined in claim 1, further comprising:
   a drive current change circuit that switches a current value of the drive signal between a first current value and a second current value that differs from the first current value at least when the phase difference is set to the first phase difference or when the phase difference is set to the second phase difference.

3. The physical quantity detection circuit as defined in claim 1, further comprising:
   an abnormality determination section that determines whether or not the physical quantity detection circuit is abnormal based on a signal output from the synchronous detection circuit.

4. The physical quantity detection circuit as defined in claim 3, further comprising:
   a register,
   the abnormality determination section writing error information into the register when it has been determined that the physical quantity detection circuit is abnormal.

5. The physical quantity detection circuit as defined in claim 3,
   the abnormality determination section outputting an error signal to the outside when it has been determined that the physical quantity detection circuit is abnormal.

6. The physical quantity detection circuit as defined in claim 3,
   the abnormality determination section determining whether or not the physical quantity detection circuit is abnormal based on both a signal output from the synchronous detection circuit when the phase difference is set to the first phase difference and a signal output from the synchronous detection circuit when the phase difference is set to the second phase difference.

7. An electronic device comprising:
   the physical quantity detection circuit as defined in claim 1; and
   the physical quantity detection element.

8. A moving object comprising the physical quantity detection circuit as defined in claim 1.

* * * * *